Patented Oct. 27, 1953

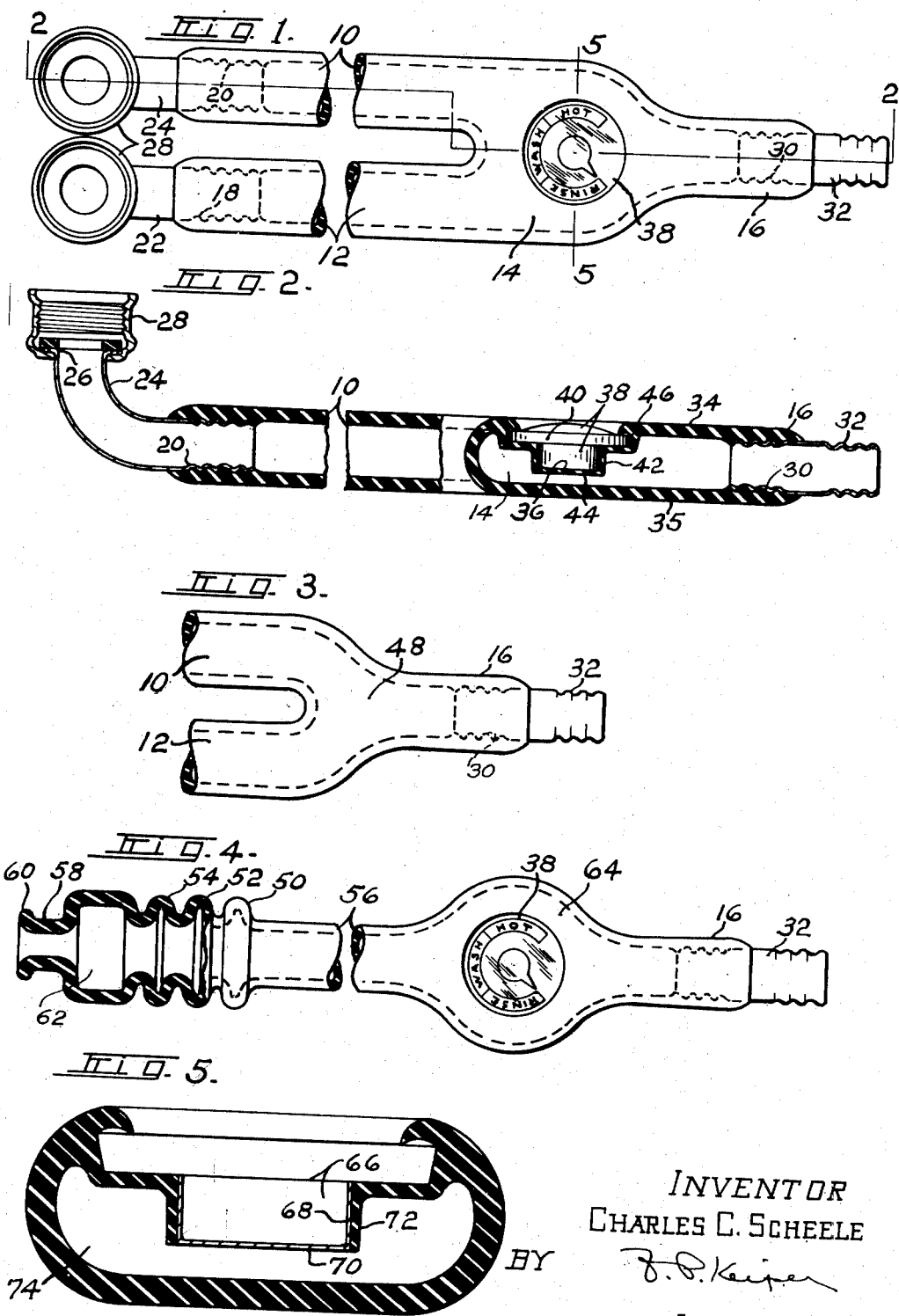

2,656,853

UNITED STATES PATENT OFFICE 2,656,853

BRANCH HOSE CONNECTOR

Charles C. Scheele, Syracuse, N. Y.

Application June 1, 1949, Serial No. 96,530

2 Claims. (Cl. 137—551)

This invention relates to hose connectors for appliances including dish and bath sprays, and the like, and more particularly to connectors of the mixing and temperature indicating type.

Hose connectors of the type referred to have in general been formed of cut lengths of hose suitably connected by metal fittings such as Y connectors and faucet or standard threaded end fittings. It is an object of the present invention to provide a connector in which the body portion shall be formed in one piece of resilient plastic rubber-like material, and in which a mixing chamber is provided with a temperature indicator. Other objects of the invention relate to the form and position of the mixing chamber, and integral end fittings for flexible faucet connection.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a plan view of a one-piece connector of Y configuration, having mixing chamber and associated temperature indicator;

Figure 2 is a broken longitudinal sectional view of Figure 1, taken substantially on line 2—2;

Figure 3 is a modified form of Figure 1, wherein the mixing chamber is modified and the temperature indicator eliminated;

Figure 4 is a modified form of the invention adapted to connect to a mixed water supply, and having a further mixing chamber and temperature indicator; and Figure 5 is a transverse section taken through the mixing chamber of a modified connector, showing a modified receptacle cavity for a temperature indicator, the section being taken substantially along a plane disposed as roughly indicated by the line 5—5 of Figure 1.

Referring to Figures 1 and 2, there is shown a connector having a main portion formed of a single piece of molded resilient plastic such as rubber or rubber-like material, as, for example, neoprene. The molded one-piece portion comprises branch tubes 10 and 12, merging into a mixing chamber 14, which in turn connects to a discharge outlet or trunk 16. The branch tubes are preferably circular in cross section and provided with a series of annular corrugations 18 and 20 near the end, in order to provide a solid grip upon metal sleeves such as 22 and 24, which in the form shown, are suitably curved to form a right angle bend, terminating in a washer seat and flange as at 26, and there provided with an internally threaded standard hose connection thimble 28.

The trunk outlet portion may be similarly internally annularly corrugated as at 30 to receive complementary corrugations of a metal sleeve 32 or other member as desired. It will be appreciated that the corrugations 30, as well as 18 and 20, may be somewhat saw tooth in shape to provide greater gripping power against axial pressure forces tending to pull the trunk or branches from the respective sleeves.

The mixing chamber 14 is of rounded rectangular cross section, providing top and bottom surfaces 34 and 36, the chamber walls smoothly blending into the inlet branches, and outlet trunk. In the form shown in Figures 1 and 2, the upper surface is provided with a molded annular depression 36 to receive a suitable heat sensitive device or thermometer 38, the latter having a cylindrical casing drum and enlarged bezel or dial retaining annular flange portion 40. The molded annular depression is adapted to complementarily fit about the thermometer 38. The depression comprises hollow cylindrical and end walls 42 and 44 for embracing the casing drum, and an internal annular groove 46 for receiving the bezel portion. The annular groove 46 is adapted to resiliently retain the thermometer or other device in the position shown, although at the same time, the resiliency is such as to permit distortion for the purpose of either removing or replacing the thermometer.

In the modification shown in Figure 3, no indicating device is provided and the inlet branches 10 and 12 emerge into an outlet trunk 16, the mixing chamber 48 being considerably reduced in size.

In the arrangement shown in Figure 4, a flexible faucet connection is shown which comprises a series of integral corrugations 50, 52 and 54 interposed between the inlet tube 56 and the nipple 58 adapted for engagement upon a variety of standard faucets as will be well understood in the art. The nipple 58 is provided at its outer end with a bead 60 to enhance the grip of the nipple 58 upon the faucet, either directly or by rolling back over the outer wall of the nipple 58. Such nipple also provides a shouldered shank capable of receiving an exterior hose clamp, should it be found desirable. Between the nipple 58 and the corrugations 54, there is provided an enlarged diameter section 62 providing adequate clearance for the faucet end which in many instances will project through the nipple 58 and into the enlarged area provided by the enlarged diameter section.

In the arrangement shown in Figure 4, a single inlet tube 56 leads to an enlarged portion 64 forming a chamber for the reception of a temperature indicator or other device 38, such as previously described. The temperature indicator is positioned in the top surface of the enlarged portion 64 within a molded depression similar to that shown in Figures 1 and 2. The enlarged portion 64 in turn leads to an outlet trunk as previously described. It will be appreciated that while the flexible faucet connector is shown in Figure 4 with a single inlet connector, such flexible faucet connection may be substituted for the curved sleeves 22 and 24 shown in Figures 1 and 2, thus providing a one-piece rubber Y connector having integral nipples for reception of a pair of hot and cold water supply faucets.

In the modification shown in Figure 5, the depression in the upper surface for the reception of the thermometer or other device is provided with a central metal cup 66 having a cylindrical side wall 68 and flat bottom wall 70. The side wall 68 is suitably bonded to an annular depending flange 72 integral with the top wall of the molded rubber depression. It will be appreciated that the utilization of the metal cup 66 affords a more rapid transfer of heat from water within the mixing chamber 74 to a heat-sensitive instrument within the cup than would be possible with a rubber or rubber-like material wall, although relatively thin, as shown and described in connection with Figures 1 and 2.

The rubber-like material chosen for molding the connectors shown will be of sufficient resiliency to permit the removal of core elements utilized in the molding process, the resiliency being such as to preferably stretch to a degree to permit such removal, and when so stretched, will approach the approximate maximum yield of such material. Thus, the finished connector will have substantial self-sustaining qualities to retain its shape and to retain the shape of the non-circular cross section mixing chamber under ordinary operating pressures without permitting undue distortion thereof. It will be appreciated that connectors of the type described will be employed on the outlet side of domestic water supply faucets, and will be subject to little or no back pressure which would tend to stretch, expand or distort the molded shape described.

While several modifications and variations of the invention have been described, it will be appreciated that various combinations may be molded to suit requirements. For example, as has previously been suggested, the flexible nipple construction of Figure 4 may be substituted for each of the threaded couplings disclosed in the Y connection modification, and either form of thermometer depression may be employed as may be found most practical. Additionally, if desired, the thermometer may be eliminated completely as suggested in Figure 3, and the nipple connector of Figure 4 may be utilized in connection with a single tube connector.

While various embodiments of the invention have been illustrated and described, it is to be understood that the invention is not limited thereto. As various changes in the construction and arrangement may be made without departing from the spirit of the invention as will be apparent to those skilled in the art, reference will be had to the appended claims for a definition of the limits of the invention.

What is claimed is:

1. In a detachable mixer hose, a molded one-piece branched tube of flexible resilient plastic, having hot and cold fluid inlet branch portions, and a trunk outlet portion, said portions being joined in a mixing chamber, the branch portions and trunk portion extending in opposite directions and in substantial parallelism with each other, and said mixing chamber having opposed relatively flat walls, one having an annular recess projecting into the mixing chamber for the reception of a water temperature indicator, said recess having a circular walled metallic shell forming a part of the wall, the wall of said shell being bonded to plastic forming the annular recess.

2. In a detachable mixer hose, a molded one-piece branched tube of flexible resilient plastic, having hot and cold fluid inlet branch portions, and a trunk outlet portion, said portions being joined in a mixing chamber, the branch portions and trunk portion extending in opposite directions and in substantial parallelism with each other, and said mixing chamber having opposed relatively flat walls, one having an annular recess projecting into the mixing chamber for the reception of a water temperature indicator, said recess having a shoulder and an inwardly directed circular resilient lip defining a channel for receiving an indicator bezel.

CHARLES C. SCHEELE.

References Cited in the file of this patent

UNITED STATES PATENTS

| Number | Name | Date |
| --- | --- | --- |
| 338,045 | Easton | Mar. 16, 1886 |
| 587,902 | Wilson | Aug. 10, 1897 |
| 1,179,538 | Mapel | Apr. 18, 1916 |
| 1,385,179 | Liska | July 19, 1921 |
| 1,773,643 | Romanchak | Aug. 19, 1930 |
| 1,963,522 | Gavaza | June 19, 1934 |
| 2,357,692 | Saffady | Sept. 5, 1944 |
| 2,511,291 | Mueller | June 13, 1950 |

FOREIGN PATENTS

| Number | Country | Date |
| --- | --- | --- |
| 44,863 | Denmark | of 1931 |
| 722,401 | France | Dec. 29, 1931 |